July 11, 1961
W. F. FARBER
2,992,026
TELESCOPE JOINT LOCK
Filed Feb. 6, 1959
3 Sheets-Sheet 1
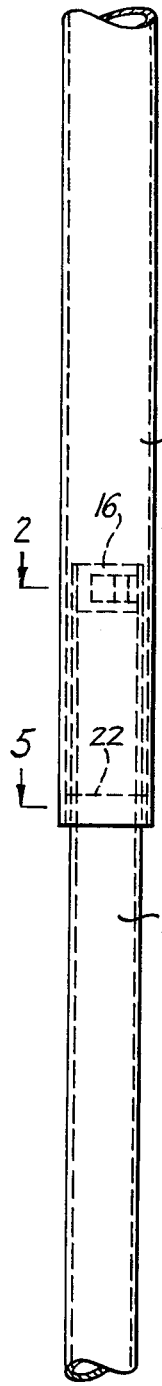
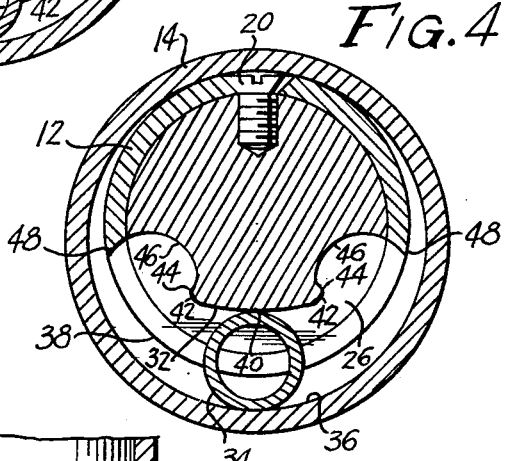
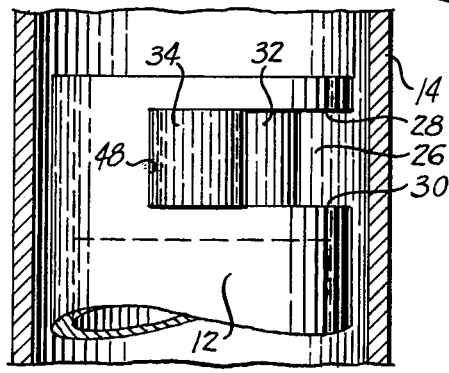
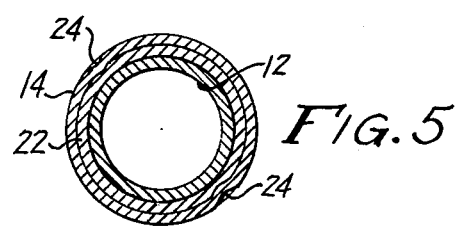
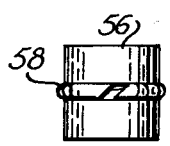
INVENTOR.
WAYNE F. FARBER
BY
Gustave Miller
ATTORNEY

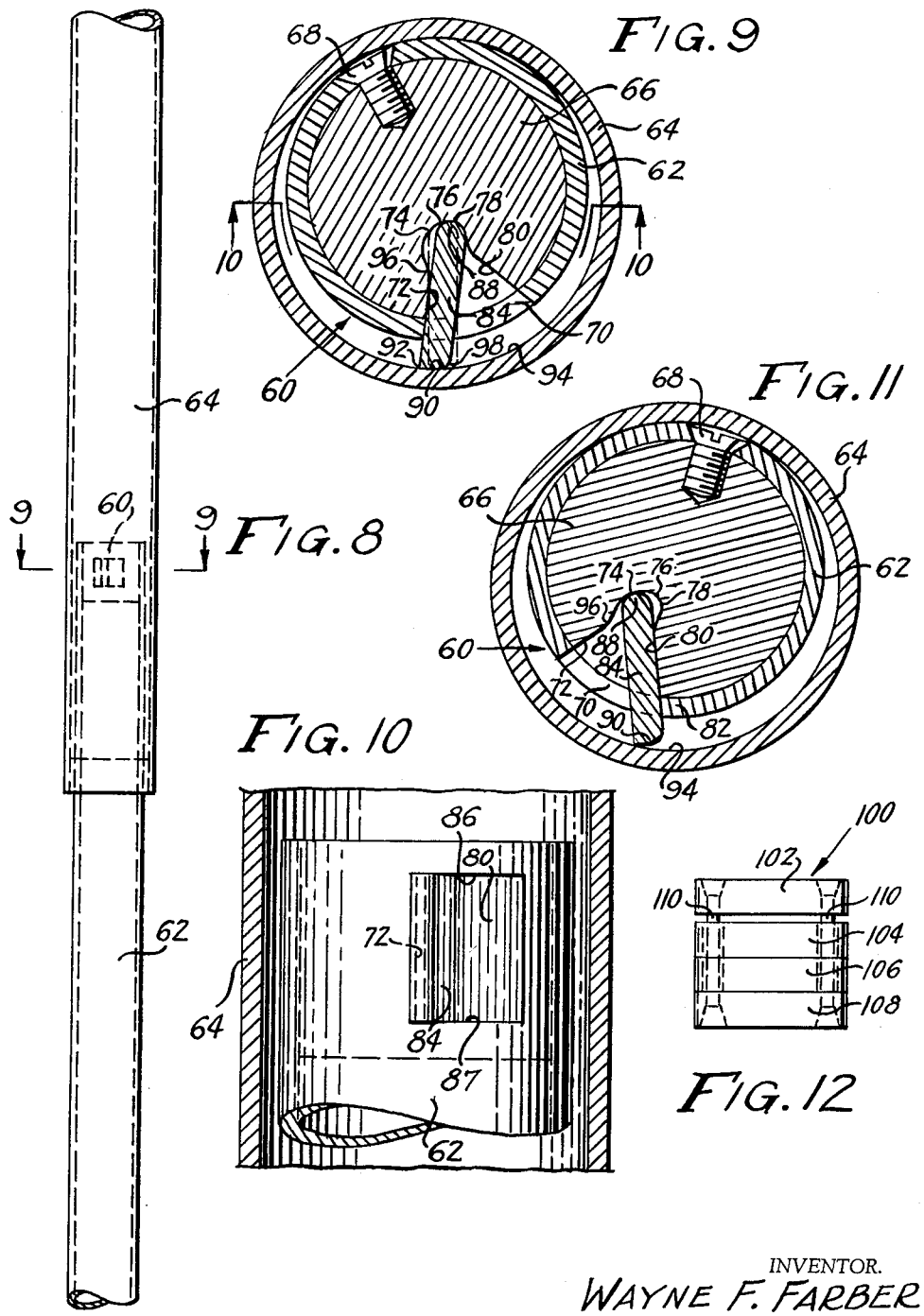

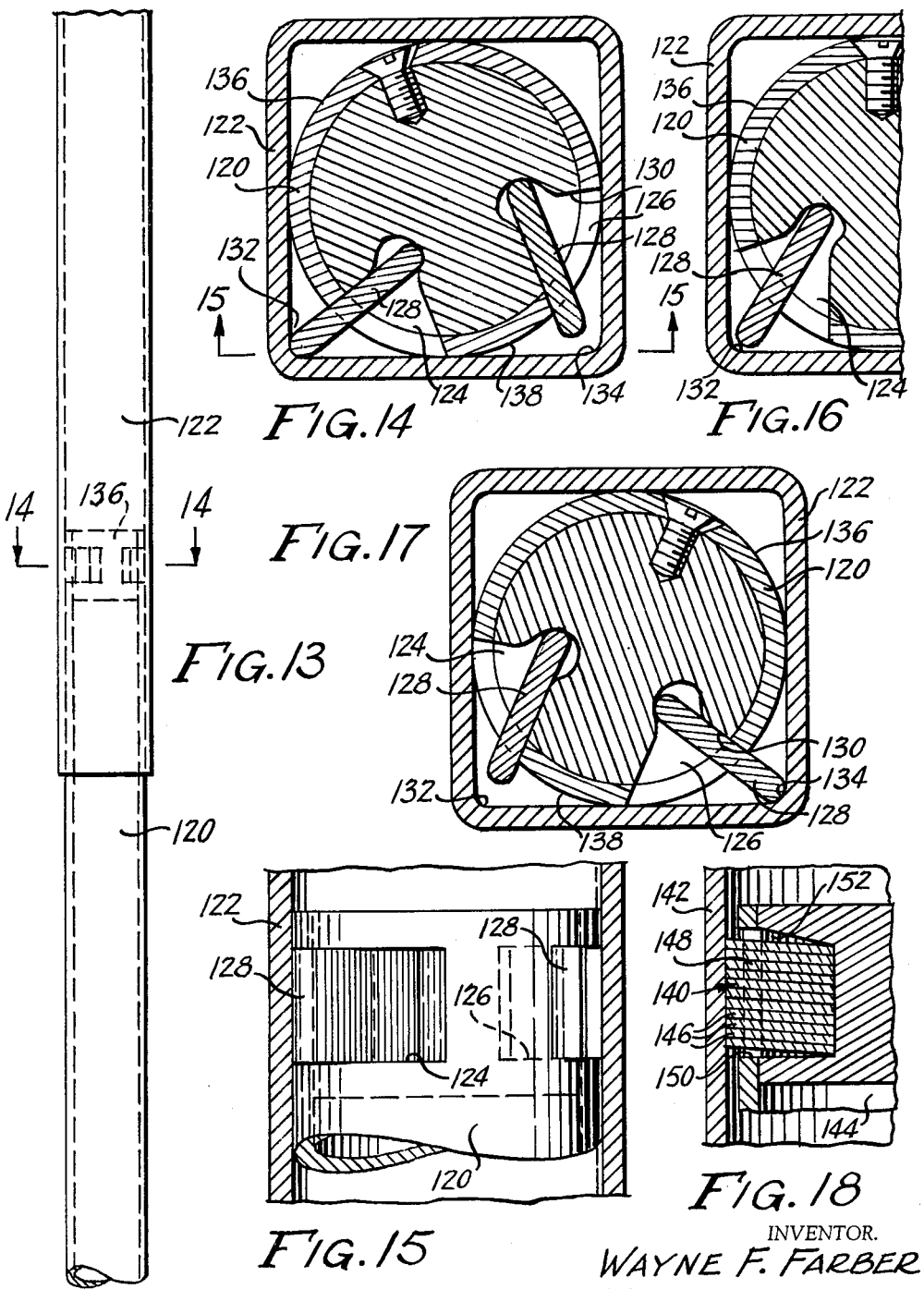

United States Patent Office 2,992,026
Patented July 11, 1961

2,992,026
TELESCOPE JOINT LOCK
Wayne F. Farber, Moline, Ill., assignor to
Gustave Miller, Washington, D.C.
Filed Feb. 6, 1959, Ser. No. 791,723
11 Claims. (Cl. 287—58)

This invention relates to a telescoped joint lock particularly intended for use where two or more adjustably telescoping members are to be locked in any desired adjusted position by rotating one telescoping member relative to the other in a selected direction, and may be released from locked adjusted position by relative rotation in the opposite direction.

This invention has among its objects the production of a telescope joint lock for connecting two members, such as a pair of telescoping members, whereby the latter may be longitudinally adjusted in any desired relative position and readily locked in such adjusted position by mere manual rotation of the two telescoping members relative to each other without the use of any tools, in order to lock the members in the desired adjusted position.

A further object of this invention is to provide a telescope joint lock which will take considerable torque stresses as well as compression or tension stresses between the two members and yet may be readily unlocked or adjusted.

Still a further object of this invention is to provide a telescopic lock joint which may be constructed to provide locking action by relative rotation of the two adjustable telescoping members from an intermediate position in either direction, and, also may be constructed to provide a locking action when rotated in one direction only and an unlocking action when rotated in the opposite direction only.

Yet a further object of this invention is to provide a telescope lock joint which may be readily employed with two telescoping members wherein all of the actuating mechanism is concealed within the members so that none of the mechanism is visible at the exterior thereof.

There are innumerable types of telescoping members to which the lock joint of this invention may be applied, where it is desired to lock an extensible member in a desired adjusted position such as, for example, in tripods, extension shafts, handles of many varieties, including tool handles, concrete trowel handles and many other types and styles of handles where it is necessary or desirable that such shafts be of one length at one time, and of a different length at a different time. This invention may likewise be applied to table legs, for instance, even when the table legs are polygonal in cross-section, such as square or otherwise so that the height of the table may be adjusted when desired.

Briefly, the invention includes a recessed cam surface provided on the inner telescoping member with its cam surface extending at a varying depth from the surface of the inner telescopic member, and a key member located in the recess between the cam surface and the inner surface of the outer telescoping member and caused to move between a position of maximum depth of the cam surface which is the unlocked position past a position of minimum depth to a position of slightly greater than minimum depth, which is the locked position, the minimum depth of the cam surface providing a toggle dead center. When the key member is moved beyond this dead center position, it is thereby held tending to hold the key member in locked position against vibration such as caused by normal use of the telescoping members, which might otherwise tend to release or destroy the locking effect. To insure that the key member will readily move between locked and unlocked position, it may be provided with friction increasing means to minimize slippage that might otherwise take place, especially in unlocked position.

With the foregoing and other objects in view, this invention comprises the combination, construction and arrangement of parts hereinafter set forth claimed and disclosed in the accompanying drawing, wherein, FIG. 1 is an elevational view, partly in phantom, of two telescoping members to which the telescope lock joint of this invention has been applied.

FIG. 2 is a section on line 2—2 of FIG. 1 through the lock joint mechanism per se.

FIG. 3 is a section view on line 3—3 of FIG. 2.

FIG. 4 is a sectional view similar to FIG. 2, but showing the joint lock in unlocked position.

FIG. 5 is a sectional view on line 5—5 of FIG. 1 through the flanged enveloping end of the outer telescoping member.

FIG. 6 is an elevational view of a cylindrical locking key that is serrated both circumferentially and longitudinally.

FIG. 7 is an elevational view of another type of cylindrical key provided with an O-ring.

FIG. 8 is an elevational view partly in phantom of a pair of telescoping members having a different type of telescope joint lock of this invention applied thereto.

FIG. 9 is a sectional view on line 9—9 of FIG. 8, showing the telescope joint lock in locked position.

FIG. 10 is a sectional view on line 10—10 of FIG. 9.

FIG. 11 is a sectional view similar to FIG. 9 but showing the joint lock in unlocked position.

FIG. 12 is an elevational view of a modified form of key member.

FIG. 13 is an elevational view of a form of this telescope joint lock applied to a pair of telescoping members wherein the outer telescoping member is other than cylindrical in outline.

FIG. 14 is a sectional view on line 14—14 of FIG. 13, with the telescoping members locked together by relative rotation in one direction.

FIG. 15 is a sectional view on line 15—15 of FIG. 14.

FIG. 16 is a fragmentary sectional view similar to FIG. 14 but showing the telescoping members in unlocked position through partial relative rotation of the members away from the position shown in FIG. 14.

FIG. 17 is a similar sectional view but showing the telescoping members in locked position through maximum relative rotation in the opposite direction from that of FIG. 14.

FIG. 18 is an axial sectional view through a modified form of telescope joint lock with a modified type of key member.

There is shown at 10 a pair of telescoping members consisting of an inner telescoping member 12 and an outer telescoping member 14 to which the telescope joint lock has been applied as at 16. The outer telescoping member 14 is obviously hollow, and preferably, although not necessarily, cylindrical in shape, and the inner telescoping member 12 is also preferably cylindrical in shape although, of course, there may be some deviation from cylindrical and when other than cylindrical it will probably generally conform in shape to the shape of the hollow portion of the outer telescoping member 14.

The inner cylindrical member 12 may be a solid rod, or if a hollow cylinder as shown, it is provided with a solid plug 18 suitably secured therein adjacent the end to be inserted in the outer telescoping member as by a counter-sunk screw 20, although of course any other securing means may be provided.

The external diameter of the inner telescoping member 12 is somewhat less than the internal diameter of the outer telescoping member 14, and to prevent the outer member 14 from wobbling too greatly on the inner member 12, an internal flange 22 is provided on the end of the outer telescoping member that envelopes or encompasses the inner telescoping member 12.

This internal flange 22 may be secured in any suitable manner, such as by punched indentations shown at 24, or it could be spot welded or secured in any other suitable manner.

The joint lock 16 is provided by forming a recess 26 through the solid or plug end of the inner telescoping member 12. This recess 26 is defined by upper and lower shoulders 28 and 30 and by a recess wall 32 which is cam-shaped and cooperates with a key member 34 in providing the locking action.

The key member 34 in this form of the invention is generally cylindrical, and is of a length to be confined between the shoulders 28 and 30, in one direction and to be confined between the recess wall 32 and the inner surface 36 of the outer cylindrical telescoping member 14.

The recess wall 32 provides a cam surface of varying depth along the radii from the outer surface 38 of the inner telescoping member 12. This cam surface has its maximum depth at a point 40 of minimum pressure corresponding to the unlocked position and from this minimum pressure point 40, the cam surface gradually extends toward the outer surface 38 of inner telescoping member 12 until it reaches a point 42 of maximum pressure, and then it again recedes from the outer surface at about a point 44 of slightly less than maximum pressure which is very close to and just beyond the point 40. The recess wall 32 extends beyond the point 44, but it is merely a recess wall as at 46 and is no longer a cam surface. This recess wall 46 terminates in an end point 48 coinciding with the outer surface 38 of the inner telescoping member 12, the chord between points 44 and 48 being slightly less than a similar chord extending through the key member 34.

In operation, rotating the telescoping members relative to each other will cause the key member 34 to roll on the cam surface and the minimum pressure point 40 of maximum depth to the maximum pressure point 42 of minimum depth and then, under further rotative action it will pass this point 42 of minimum depth and snap into the position of slightly less than maximum pressure shown in FIG. 2 and contact the points 44 and 48. Inasmuch as the key member 34 is now past the maximum pressure point 42 of minimum depth, it will necessarily remain in contact with the points 44 and 48 until a sufficient rotative force is provided on one of the telescoping members relative to the other so as to cause it to pass the maximum pressure point 42 of minimum depth and return to the minimum pressure point 40 of maximum depth. Irrespective of the material of which the key member and the telescoping members may be made, there will necessarily be some yielding due to inherent resiliency of material as the key member 34 passes in one direction or the other over the point 42 of minimum depth and this point 42 of minimum depth thereby provides a toggle off-center action holding the key member to one side or the other thereof at all times except when rotative force is applied between the telescoping members.

When the key member 34 is at the minimum pressure point 40 of maximum depth, there will be light contact between the cam surface and the key member on one side and the inner surface 36 of outer telescoping member 14 on the other side. As the telescoping members are rotated relative to one another, this minimum pressure contact will increase and it reaches a maximum as the key member reaches the maximum pressure point 42 and then is very slightly decreased as the key member snaps past the maximum pressure point 42 to the point 44 of slightly less than maximum pressure and also in contact with the point 48. Although at this position as shown in FIG. 2, the key member provides slightly less than maximum pressure contact between the inner and outer members, it still provides much more than sufficient pressure contact to provide a secure locking effect and thus provide a secure lock joint between the inner and outer members.

This lock joint will be more than ample to prevent relative axial adjustment of the telescoping members relative to each other. However, when the key member 34 is located at the minimum pressure point 40 of maximum cam surface depth, the pressure of the key member between the inner telescoping member and the inner surface of the outer telescoping member will be so slight, just a very slight bare minimum frictional contact, that the telescoping members 12 and 14 may be easily adjusted axially of each other to any desired position, whereupon the members may be locked in the desired position by rotating them relative to one another.

As shown, the point of maximum cam surface depth, minimum pressure point 40, is shown as located between or intermediate of two duplicate maximum pressure points 42 and slightly less than maximum pressure points 44 and similar recess wall sections 46 and end points 48, and as a result of this duplication, the telescoping members may be locked to each other by maximum rotation in either direction and unlocked from each other by rotation to a midpoint. Obviously, one end of the cam surface from point 40 to point 48 may be provided alone if it were desired that it be locked by maximum rotation in one direction and unlocked by maximum rotation in the opposite direction. However, there are many types of uses where the telescoping handles may provide part of a tool or instrumentality which, when in use, at some time there is a tendency to exert rotative force in one direction and at other times in use, the rotative force may be exerted in the other direction. In such circumstances, of course, it is very desirable that the duplicate locking surfaces be provided on opposite sides of the unlocked position so that the telescoping members may be locked by rotation in the desired direction. One example of such use, for instance, would be in a screw driver, particularly an extensible power screw driver used sometimes for inserting screws, and at other times for extracting screws. Another example might be the handle of a trowel for concrete, which handle it is desired to lengthen or shorten according to the place it is being used, and which may be used adjacent one wall in a confined area where there is a tendency to rotate the handle as used in one direction and later on, adjacent an opposite wall where there would be a tendency in use to rotate the handle in the opposite direction. By providing duplicate locks as herein shown, the handle may be locked against accidental separation in spite of this tendency to rotate the handle in use.

In order to provide the key member 34 with a suitable friction surface so that it will readily roll on the cam surface as it is rotated, and hence move between the locked and unlocked position, additional friction means may be provided on the surface of the key member 34. One form of additional friction means is shown in a modified form of key member shown at 50 in FIG. 6. This key member 50 is likewise generally cylindrical and is provided with axially extending serrations 52 and circumferentially extending serrations 54, the axially extending serrations 52 of course providing what is often called a milled surface. Either or both sets of serrations may be provided on a key member, and the friction surface provided by these serrations will insure that the key member will roll along between the outer telescoping member inner surface 36 and the cam wall surface 32 without slipping, and thus readily pass the minimum depth point 42 between locked and unlocked positions.

In FIG. 7, another form of cylindrical key member 56 is provided having a rubber or yieldable plastic O-ring 58 recessed therein about its midpoint to thus provide the desired frictional contact.

In FIGS. 8, 9, 10 and 11, another form of lock joint 60 is provided between an inner telescoping member 62 and an outer telescoping member 64.

This lock joint 60 is formed in a solid plug 66 secured by a screw or other suitable means 68 in the locking end of the inner cylindrical member 62. This locking end of the inner cylindrical member 62, which includes the solid plug 66, is provided with a somewhat sector-shaped recess 70 consisting of a short straight wall 72 leading to a counter-sunk curved seat 74 providing an unlocking position point of minimum pressure which then curves around to a cam surface 76 providing a point of maximum pressure which curves back through a locking position point of slightly less than maximum pressure, at 78 to a straight wall portion 80 leading back to the outer surface 82 of the inner cylindrical telescoping member 62. It will be noted that the straight wall portion 80 is of much greater depth than the straight wall portion 72 and if the center line of the flat key 84 were projected through the inner telescoping member 62 and 66 when lying flat against each wall 72 and 80, the projected center lines would cross each other before passing on opposite sides of the center of the inner telescoping member 62 and 66. In this form of joint lock, the key member 84 is in the form of a flat plate-like member extending axially between an upper shoulder 86 and a lower shoulder 87 of the recess 70. The upper and lower ends of the key member 84 are in parallel planes so as to be readily confined between the shoulders 86 and 87 and readily slide therebetween. The inner end 88 of key member 84 is rounded so that it may slide over the cam surface maximum pressure point 76 between the recessed seat minimum pressure point 74 and recessed seat 78 providing the slightly less than maximum pressure point between the inner ends of the flat walls 72 and 80, the cam surface maximum pressure point 76 thus acting to cam the rounded inner end 88 to either seat points 74 or 78 providing a toggle effect thereto.

The outer end 90 of the key member 84 is substantially flat, although the vertical edges of the end 90 may be very slightly rounded.

Between the recessed counter-sunk seat portion minimum pressure point at 74 in the wall 72 and the slightly less than maximum pressure point in recessed counter-sunk seat portion 78 in the wall 80, there is provided the cam surface maximum pressure point 76, this cam surface maximum pressure point 76 being so located between these two recessed seat portions 74 and 78 that when the key member 84 is in unlocked position against the wall 80, the key inner end 88 extends into the recessed seat minimum pressure point 74 that is located in the wall 72, and is thus on one side of the cam surface maximum pressure point 76, the distance of this recessed seat minimum pressure point 74 from the outer end of wall 80 being greater than the distance of the recessed seat 78 from the outer end of recess wall 72.

In operation, the lock joint 60 is operated by relatively rotating the telescoping members 62 and 64 one to the other in one direction for locking, and in the opposite direction for unlocking, it being obvious that the locking recess may be permanently located for operation in a desired direction. In FIG. 11, the key member 84 is shown in unlocked position, and in this position, it will be noted that the rounded end 88 of key member 84 is located in the recess minimum pressure point unlocking position 74 to one side of the cam surface maximum pressure point 76. The flat end 90 of key member 84 has one edge 92 in light frictional contact with the inner surface 94 of the outer telescoping member 64. Rotating the inner cylindrical member 62 from the unlocked position shown in FIG. 11 to the locked position shown in FIG. 9 will cause the key member 84 to be pushed by the curved cam surface 96 of recess minimum pressure point unlocking position 74 as it approaches the short straight wall portion 72 and cause the rounded end 88 of key member 84 to slide over the cam surface maximum pressure point 76 into locking position recess 78, the maximum pressure being applied as it passes over the cam surface maximum pressure point 76 to seat in the locking position recess 78 with the other side of the key member 84 now in contact with the side wall 72 as shown in FIG. 9. Meantime, the flat end 90 of key member 84 will be pressing against the inner surface 94 of outer telescoping member 64 with both its longitudinal edges 92 and 98 in pressure-tight contact with the inner surface 94 of outer telescoping member 64. The rounded end 88 will meantime have passed over the cam surface maximum pressure point 76 to seat in the locking position recess 78, this cam surface maximum pressure point 76 thus providing a toggle off-center effect to hold the key member 84 on one side or the other thereof until it is positively located in one direction or the other between locking and unlocking position. In locked position, the cam surface maximum pressure point 76 necessarily holds the key member 84 in the full line position shown in FIG. 9 until sufficient rotative pressure has been provided so as to cause the rounded end 88 to pass out of the locking position recess 78 over the cam surface maximum pressure point 76 to the minimum pressure point unlocking position in the recess 74.

As will be apparent, it is always necessary that there be some frictional contact between the outer end of the key member 84 and the inner surface 94 of outer telescoping member 64. In FIG. 12, another form of key member is shown which will provide increased frictional contact. In this form, the key member shown at 100 consists of a number of parallel leaves 102, 104, 106 and 108 loosely pinned together by means of a pair of counter-sunk pins 110. Due to the loose pinning together of these separate leaves 102 to 108, the outer ends of the key member leaves will individually contact the inner surface of the outer telescoping member and tend to slightly separate as they do so, thus providing a more effective holding action thereagainst.

The lock joint of this invention is shown as applied to still another form of telescoping members in FIGS. 13 to 17 inclusive. In this form, while the inner telescoping member 120 is cylindrical similar to the inner telescoping member 62, the outer telescoping member 122 is of a regular polygonal shape, this form being square shaped, as apparent in FIGS. 14, 16 and 17, and the lock joint 136 at the inner or lock end of inner telescoping member 120 is substantially identical with that already described in connection with FIGS. 9 and 11, except that two locking recesses 124 and 126 are provided. Each lock recess 124 and 126 is shaped substantially the same as lock recesses 70 already described in connection with FIGS. 9 and 11, except that lock recess 126 is a mirror image of lock recess 124. These lock recesses 124 and 126 are so located that their key members 128 and 130, when in locked position, contact the inner surfaces of one of two adjacent corners 132 and 134 and when in unlocked position, are out of contact therewith. The lock recesses 124 and 126 being mirror images, and operating in opposite directions, only one of the key members 128 will be operative at one time so that the lock joint 136 may be locked by relatively rotating the inner and outer telescoping members to a maximum position. Thus, the telescoping members are locked together by rotation to a maximum amount in either direction. In order to adjust the telescoping members axially of each other, the telescoping members 120 and 122 are rotated to an intermediate position as shown in FIG. 16 between the maximum positions of rotation and in this position, the intermediate point 138 of the outer surface of inner telescoping member 120 between the lock recesses 124 will come into contact with the inner wall of the square outer telescoping member 122, and both key members 128 will have their outer ends completely out of contact with any portion of the outer square telescoping member 122 as shown in FIG. 16.

The cam surfaces of lock recess 124 being identical with the cam surfaces already particularly described in connection with FIGS. 8 to 11, and the camming action when going into locked position being identical, no further description thereof is here believed to be necessary.

There is shown in FIG. 18 another form of key member at 140 intended for use where the telescoping members 142 and 144 may be under extremely high compressive force tending to force the outer telescoping member 142 downwardly over the inner telescoping member 144 as shown in FIG. 18. In this case, the key member 140 is made up of a number of individual leaves 146 loosely pinned together as at 148 and extending at a slight angle upwardly from the bottom shoulder 150 of the lock recess, while the upper shoulder 152 is at a still greater angle to the shoulder 150 so as to provide some leeway for loose movement of the leaves 146 relative to each other on their pin 148. Otherwise, the lock recess between the lower shoulder 150 and angular upper shoulder 152 is identical with the lock recesses already described in FIGS. 9 to 11 inclusive.

In operation in this form, the key member 140 operates identically with the key member 84 when the outer telescoping member 142 is rotated relative to the inner telescoping member 144. However, when placed in locked position, there is additional resistance to axial movement of the telescoping members to each other due to the wedging effect provided by the angle of the individual leaves, for obviously, as the outer sleeve member 142 tends to move downwardly over the inner sleeve member 144, the outer ends of the individual leaves 146 tend to approach the lower shoulder 150 and this will wedge the locking end of inner telescoping or sleeve member 144 even more tightly within the outer telescoping member 142. This is particularly desirable when the telescoping members are used as shoring means for holding heavy loads, and obviously, will provide a holding force between the two telescoping members up to the maximum yield point of the material of the telescoping members.

While the device has been shown and the structure has been described in detail in various forms, it is obvious that this invention is not to be considered as being limited to the exact forms disclosed, and changes in detail and construction may be made therein within the scope of what is claimed, without departing from the spirit of this invention.

Having thus set forth and disclosed the nature of this invention, what is claimed is:

1. A telescope joint lock comprising inner and outer telescoping members, said telescoping members being axially slidable and at least partially rotatable relative to each other, said inner telescoping member being cylindrical and having a recess wall extending therein between two spaced apart shoulders, each said shoulder extending between said recess wall and the outer cylindrical surface of said inner telescoping member, a key member confined between said shoulders in one direction and between said recess wall and the inner surface of said outer telescoping member in the other direction, said recess wall having a cam surface of varying depth from said outer cylindrical surface cooperating with said key member to cam said key member between locking contact against the inner surface of said outer member and unlocked position relative thereto as said telescoping members are rotated relative to each other, the depth of said cam surface along the radii of said inner member varying from a minimum pressure point when in key member unlocking position to a maximum pressure point, spaced from said minimum pressure point, when in key member binding position, and then to a point of slightly less than maximum pressure, just beyond the maximum pressure point when in key member locking position, said cam surface approaching and reaching a minimum depth just before the key member locking position and extending to a slightly greater depth at the key member locking position.

2. The telescope joint lock of claim 1, said key member being cylindrical in cross-section and rollable between locking and unlocking position.

3. The telescope joint lock of claim 2, said key member having a friction increasing surface.

4. The telescope joint lock of claim 3, said key member friction increasing surface comprising a compressible O-ring recessed circumferentially therein.

5. The telescope joint lock of claim 1, said key member being a flat plate-like member, a rounded cam wall cooperating surface at its inner end contacting and slidable over said cam wall surface maximum pressure point between locked and unlocked positions.

6. The telescope joint lock of claim 5, said outer telescoping member being cylindrical, said key member having a substantially flat outer end contacting the inner surface of said outer cylindrical telescoping member.

7. The telescope joint member of claim 5, said outer telescoping member being a regular polygon in cross-section, the outer end of said key member contacting an inner angular end of said outer telescoping member when in locked position.

8. The telescope joint lock of claim 5, said flat plate-like key member comprising a plurality of individual plates, and pin means extending through said individual plates loosely pinning them together.

9. The telescope joint lock of claim 8, said individual plates extending at an angle to the plane of a right angular cross-section through the telescoping members and adding a wedging component of force resisting axial sliding of said telescoping members in an angle reducing direction when in locked position.

10. The telescope joint lock of claim 1, said telescoping members having an unlocked position located intermediately between two locked positions, whereby said telescoping members may be locked together by selective maximum rotation in either direction so as to remain locked against a force tending to relatively rotate said telescoping members in the selected direction.

11. The telescope joint lock of claim 1, the internal diameter of said outer telescoping member being somewhat greater than the external diameter of said inner telescoping member, and flange means at the enveloping end of said outer telescoping member on the interior thereof having an internal diameter greater than the external diameter of said internal telescoping member alone and less than said external diameter plus the distance the key member projects from the cam recess at any position.

References Cited in the file of this patent
UNITED STATES PATENTS

| | | |
|---|---|---|
| 771,951 | Wahlstrom | Oct. 11, 1904 |
| 1,011,422 | Fernandez | Dec. 12, 1911 |
| 1,031,927 | Haskins | July 9, 1912 |
| 2,062,805 | Campbell | Dec. 1, 1936 |
| 2,468,862 | Collins | May 3, 1949 |
| 2,517,700 | Odin | Aug. 8, 1950 |
| 2,598,864 | Turner | June 3, 1952 |
| 2,871,044 | Peterson et al. | Jan. 27, 1959 |